(12) United States Patent
Klein (10) Patent No.: US 10,906,442 B2
(45) Date of Patent: Feb. 2, 2021

(54) VEHICLE SEAT

(71) Applicant: Adient Luxembourg Holding S.à.r.l., Luxembourg (LU)

(72) Inventor: Harald Klein, Matzenbach (DE)

(73) Assignee: Adient Luxembourg Holding S.à.r.l., Luxembourg (LU)

( * ) Notice: Subject to any disclaimer, the term of this patent is extended or adjusted under 35 U.S.C. 154(b) by 325 days.

(21) Appl. No.: 15/737,030

(22) PCT Filed: Jun. 10, 2016

(86) PCT No.: PCT/EP2016/063257
§ 371 (c)(1),
(2) Date: Dec. 15, 2017

(87) PCT Pub. No.: WO2016/202690
PCT Pub. Date: Dec. 22, 2016

(65) Prior Publication Data
US 2018/0370405 A1    Dec. 27, 2018

(30) Foreign Application Priority Data

Jun. 17, 2015  (DE) .................. 10 2015 211 159
Sep. 18, 2015  (DE) .................. 10 2015 217 989

(51) Int. Cl.
*B60N 2/90*   (2018.01)
*B60N 2/66*   (2006.01)
*A61H 9/00*   (2006.01)

(52) U.S. Cl.
CPC .............. *B60N 2/914* (2018.02); *A61H 9/00* (2013.01); *A61H 9/005* (2013.01); *A61H 9/0078* (2013.01);
(Continued)

(58) Field of Classification Search
CPC .......... A61H 7/00; A61H 7/001; A61H 7/007; A61H 9/00; A61H 9/0007; A61H 9/005;
(Continued)

(56) References Cited

U.S. PATENT DOCUMENTS 4,840,425 A * 6/1989 Noble .................... A47C 7/467
                                                    297/284.1
5,082,326 A * 1/1992 Sekido .................. B60N 2/914
                                                    297/284.6
(Continued)

FOREIGN PATENT DOCUMENTS

DE       3334864 A1 *  4/1985  ............. B60N 2/914
DE   101 39 412 A1      3/2003
(Continued)

*Primary Examiner* — Colin W Stuart
(74) *Attorney, Agent, or Firm* — Marshall & Melhorn, LLC (57) ABSTRACT

A vehicle seat (1), in particular utility vehicle seat, has a seat cushion (2), a backrest (3), and a massage system (10), which has a plurality of pressurizable elements (12) and a controller (14) for a targeted activation of the pressurizable elements (12) to achieve a massage effect. The pressurizable elements (12) are each separately pressurizable via connecting lines (16). The massage system (10) connects to a connection (22) of an external compressed air supply, in particular a compressed air supply of a vehicle, for a supply of a pressurized medium. The pressurizable elements (12) are arranged on an occupant-facing side of a foam part of a padding of the backrest (3). This is particularly in a region between the foam part and a cover of the padding. Further pressurizable elements (12) are arranged on an occupant-averted side of a foam part of a padding of the backrest (3).

20 Claims, 7 Drawing Sheets

(52) U.S. Cl.
CPC ............. B60N 2/665 (2015.04); B60N 2/976 (2018.02); *A61H 2201/0103* (2013.01); *A61H 2201/0138* (2013.01); *A61H 2201/0149* (2013.01)

(58) Field of Classification Search
CPC .... A61H 9/0078; A61H 9/0092; A61H 23/00; A61H 23/04; A61H 2201/0103; A61H 2201/0119; A61H 2201/0134; A61H 2201/0138; A61H 2201/0149; A61H 2201/1602; A61H 2201/16; A61H 2201/1623; A61H 2201/1633; A61H 2201/1628; A61H 2203/0425; A61H 2203/0431; A61H 2205/081; A61H 2205/086; A47C 23/047; A47C 27/18; B60N 2/914; B60N 2/665; B60N 2/976
USPC ....... 601/49, 86, 90, 98, 115, 146, 148–150, 601/152; 297/284.4, 284.6, 284.5
See application file for complete search history.

(56) References Cited

U.S. PATENT DOCUMENTS

| | | | | |
|---|---|---|---|---|
| 5,637,076 A * | 6/1997 | Hazard | ................ | A61H 1/0292 601/5 |
| 6,203,105 B1 * | 3/2001 | Rhodes, Jr. | .............. | A47C 4/54 297/284.6 |
| 8,608,243 B2 * | 12/2013 | Maeda | ................... | B60N 2/976 297/284.4 |
| 2002/0056709 A1 * | 5/2002 | Burt | ..................... | B60N 2/5621 219/217 |
| 2006/0217644 A1 * | 9/2006 | Ozaki | ................. | A61H 9/0078 601/148 |
| 2010/0031449 A1 * | 2/2010 | Cheng | ................. | A61H 9/0078 5/713 |
| 2010/0244504 A1 | 9/2010 | Colja et al. | | |
| 2015/0126916 A1 * | 5/2015 | Hall | ........................ | B60N 2/42 601/149 |
| 2016/0129920 A1 * | 5/2016 | Hall | ....................... | B60N 2/914 701/1 |

FOREIGN PATENT DOCUMENTS

| | | | | |
|---|---|---|---|---|
| DE | 101 52 561 A1 | 5/2003 | | |
| DE | 102 42 760 A1 | 3/2004 | | |
| DE | 102 42 760 B4 | 10/2007 | | |
| DE | 10 2007 051 759 A1 | 5/2009 | | |
| DE | 10 2010 054 492 A1 | 6/2012 | | |
| DE | 10 2012 000 167 A1 | 9/2012 | | |
| FR | 2 994 073 A1 | 2/2014 | | |
| FR | 3 009 246 A1 | 2/2015 | | |
| FR | 3009246 A1 * | 2/2015 | ............. | B60N 2/914 |

* cited by examiner

VEHICLE SEAT

CROSS REFERENCE TO RELATED APPLICATIONS

This application is a United States National Phase Application of International Application PCT/EP2016/063257 filed Jun. 10, 2016 and claims the benefit of priority under 35 U.S.C. § 119 of German Applications DE10,2015/211159.8 and DE10,2015/217989.3 filed Jun. 17, 2015 and Sep. 18, 2015 (respectively) the entire contents of which are incorporated herein by reference.

FIELD OF THE INVENTION

The invention relates to a vehicle seat, in particular a commercial vehicle seat, having a seat cushion and a backrest, and a massage system which has a plurality of elements which can be pressurized, and a controller for the targeted actuation of the elements which can be pressurized, in order to achieve a massage effect.

BACKGROUND OF THE INVENTION

DE10,2010/054492 A1 has disclosed a massage device for a backrest of a vehicle seat, which massage device has a control device, a delivery pump for delivering air, and an air cushion device which can be inflated by way of the delivery pump. It is provided here that the air cushion device has an air cushion with a plurality of inflatable chambers and ducts which connect the chambers to one another. Here, the air cushion can be filled via a single air line.

DE10242760 B4 has disclosed a vehicle seat with a massage function and a contour setting means. A vehicle seat of this type comprises a seat cushion and a backrest which are provided in each case with a plurality of elements which can be pressurized in order to influence the seat contour, and a controller for the targeted pressurization of the elements which can be pressurized, the controller being adapted to achieve different massage effects.

Furthermore, DE10139412 A1 has disclosed a vehicle seat with an active contour adjustment means, the cushion of which vehicle seat, which can be adjusted by means of compressed air, can be connected to an air pressure system of the vehicle.

DE10,2012/000167 A1 has disclosed a vehicle seat, the seat cushion and backrest of which have a cavity which can be filled with a medium and in which the medium can be stored.

Moreover, vehicle seats having different arrangements of a plurality of elements which can be pressurized are known from DE10152561 A1, DE8327656 U1 and DE10,2007/051759 A1.

SUMMARY OF THE INVENTION

The invention is based on the problem of improving a vehicle seat of the type mentioned at the outset, in particular of making possible a vehicle seat having a massage system which can be connected to an external supply which provides a pressure-conducting medium (pressurizing medium).

According to the invention, a vehicle seat, in particular a commercial vehicle seat, is provided with a seat cushion and a backrest, and a massage system which has a plurality of elements which can be pressurized and a controller for the targeted actuation of the elements which can be pressurized, in order to achieve a massage effect. The elements which can be pressurized can be loaded with a pressure in each case separately via connecting lines.

The requirements of a dedicated generation and supply for compressed air, for example by of using a pump which is installed in the vehicle seat or the like, can be avoided by virtue of the fact that the massage system can be connected to a connector of an external compressed air supply, in particular a compressed air supply of a vehicle, for the supply with a pressure-conducting medium. As a result, the production costs can advantageously be lowered, and otherwise necessary occupying of corresponding installation space for installing a corresponding pump or the like can be dispensed with, furthermore.

The elements which can be pressurized are arranged on a side of a foam part of a padding of the seat cushion and/or the backrest, which side faces an occupant, in particular in a region between the foam part and a cover of the padding. Furthermore, further elements which can be pressurized are arranged on a side of a foam part of a padding of the seat cushion and/or the backrest, which side faces away from an occupant, as a result of which a massage pressure can be transferred over a relatively large area to the back of the occupant by way of the elements which can be pressurized. Furthermore, the function of a lumbar support can be realized as a result, and the contour of the backrest can be adjusted ergonomically.

Here, furthermore, the foam part can have a plurality of recesses which are adapted in each case to an element which can be pressurized in a non-deployed state. This makes a punctiform massage of the back of the occupant possible, which massage is felt with relatively great intensity, by using the elements which can be pressurized which are arranged close to the back and, in addition, can be secured against slipping in the recesses.

In addition, it is likewise possible that a plurality of elements which can be pressurized are provided, in order to make an increased number of possible programs possible in an advantageous way.

Furthermore, the elements which can be pressurized can be connected in each case by way of a dedicated connecting line to the controller, as a result of which a multiplicity of individual massage programs can be realized.

Moreover, a regulating valve can be arranged between the connector and the controller. Here, the regulating valve can be set up, furthermore, to reduce a pressure of the pressure-conducting medium to a predefined pressure level, in particular in a range from 200 to 600 hPa, preferably in a range from 300 to 500 hPa. As a result, elements which can be pressurized can advantageously be used with a lower pressure resistance, which elements can be of less expensive and more flexible configuration.

The regulating valve can likewise be set up to limit the pressure-conducting medium to a predefined value of a volumetric flow, in particular in a range from 5 to 10 liters per minute. This has the advantage that the speed, at which the pressure-conducting medium fills the elements which can be pressurized, and therefore also the time which is required for filling the elements which can be pressurized can likewise be influenced in a targeted manner.

Furthermore, a user interface can be provided, thereby allowing an occupant can manually fill or empty one or more of the elements which can be pressurized, in a controlled manner with the pressure-conducting medium.

Before embodiments of the invention are described in greater detail in the following text using drawings, it is first of all to be noted that the invention is not restricted to the described components or the described method steps. Furthermore, the terminology which is used also does not represent a restriction, but rather has a merely exemplary character. If the singular is used in the following text in the description and the claims, the plural is in each case also included here, as long as the context does not explicitly rule this out.

In the following text, the invention is described in greater detail using advantageous exemplary embodiments which are shown in the figures. The invention is not restricted, however, to said exemplary embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
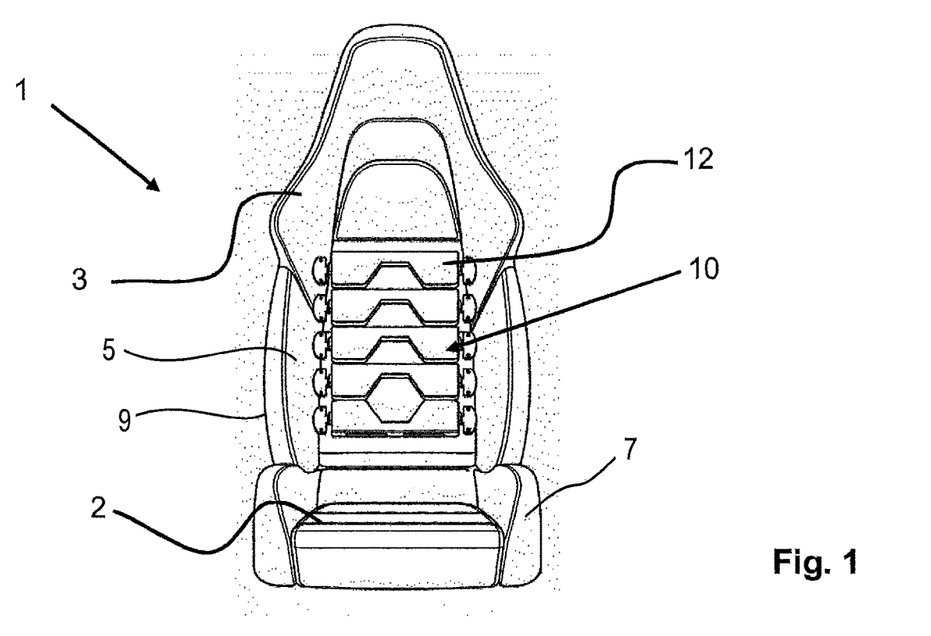
FIG. 1 is a diagrammatic view of a vehicle seat having a massage system in accordance with a first exemplary embodiment.
Figure 2:
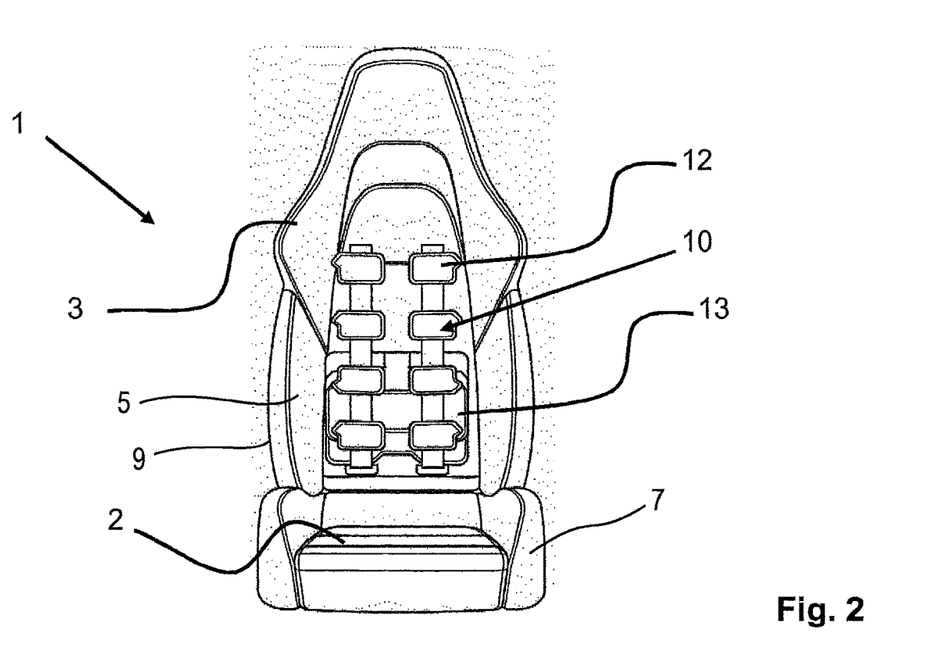
FIG. 2 is a diagrammatic view of a vehicle seat having a massage system in accordance with a second exemplary embodiment.

Referring to the drawings, FIG. 1 diagrammatically shows a vehicle seat 1 having a massage system 10 in accordance with a first exemplary embodiment. The vehicle seat 1 is, in particular, a commercial vehicle seat. The vehicle seat 1 has a seat cushion 2 and a backrest 3. As illustrated in FIGS. 1 and 2, the seat cushion 2 may include padding 7 and the backrest 3 may include padding 5. A massage system 10 which has a plurality of elements 12 which can be pressurized is arranged in the backrest 3. The massage system 10 has a controller 14 for the targeted actuation of the elements 12 which can be pressurized, in order to achieve a massage effect. The controller 14 is preferably set up to store and to execute preprogrammed massage programs which can be designed individually in terms of the sequence of the elements 12 which can be pressurized, the pressure intensity, the duration of loading with a pressure-conducting medium, or another property. Here, the elements 12 which can be pressurized can have a substantially pressure-free and non-deployed state, in which they are folded together in a flat manner as far as possible. Furthermore, the elements 12 which can be pressurized can be enlarged continuously up to a completely deployed state by way of filling with the pressure-conducting medium, the filling with the pressure-conducting medium bringing about a volumetric change of the element 12 which can be pressurized.

In accordance with the first exemplary embodiment, the depicted elements 12 which can be pressurized are arranged on what is known as a B-side 11, that is to say on the side 11, facing away from an occupant, of a padding 5, formed from a foam part, of the backrest 3 of the vehicle seat 1. The padding 5 preferably comprises a foam part which is covered at least partially with a cover 9. In accordance with an exemplary embodiment, the elements 12 which can be pressurized are hooked into a holding element (not shown for illustrative reasons) which is of corresponding configuration and is arranged, for example, in a frame structure of the backrest 3.

FIG. 2 diagrammatically shows a vehicle seat 1 having a massage system 10 in accordance with a second exemplary embodiment. The second exemplary embodiment which is shown here differs from the first exemplary embodiment according to FIG. 1 merely in that, in accordance with said second exemplary embodiment, the depicted elements 12 which can be pressurized are arranged on what is known as an A-side 13, that is to say on that side 13 of a foam part of a padding 5 of the backrest 3 of the vehicle seat 1 which faces an occupant, in particular in a region between the foam part and a cover of the padding 5. It is possible, furthermore, that, for the purpose of the elements 12 which can be pressurized being received in a manner which is secured against slipping, the foam part has a plurality of recesses 43 which are adapted in each case to an element which can be pressurized in a non-deployed state. Furthermore, the massage system 10 in accordance with the second exemplary embodiment which is shown has a lumbar support element 13 which is arranged predominantly on the B-side 11 and corresponds substantially to the construction and the operating principle of the first exemplary embodiment of the massage system 10.

Figure 3:
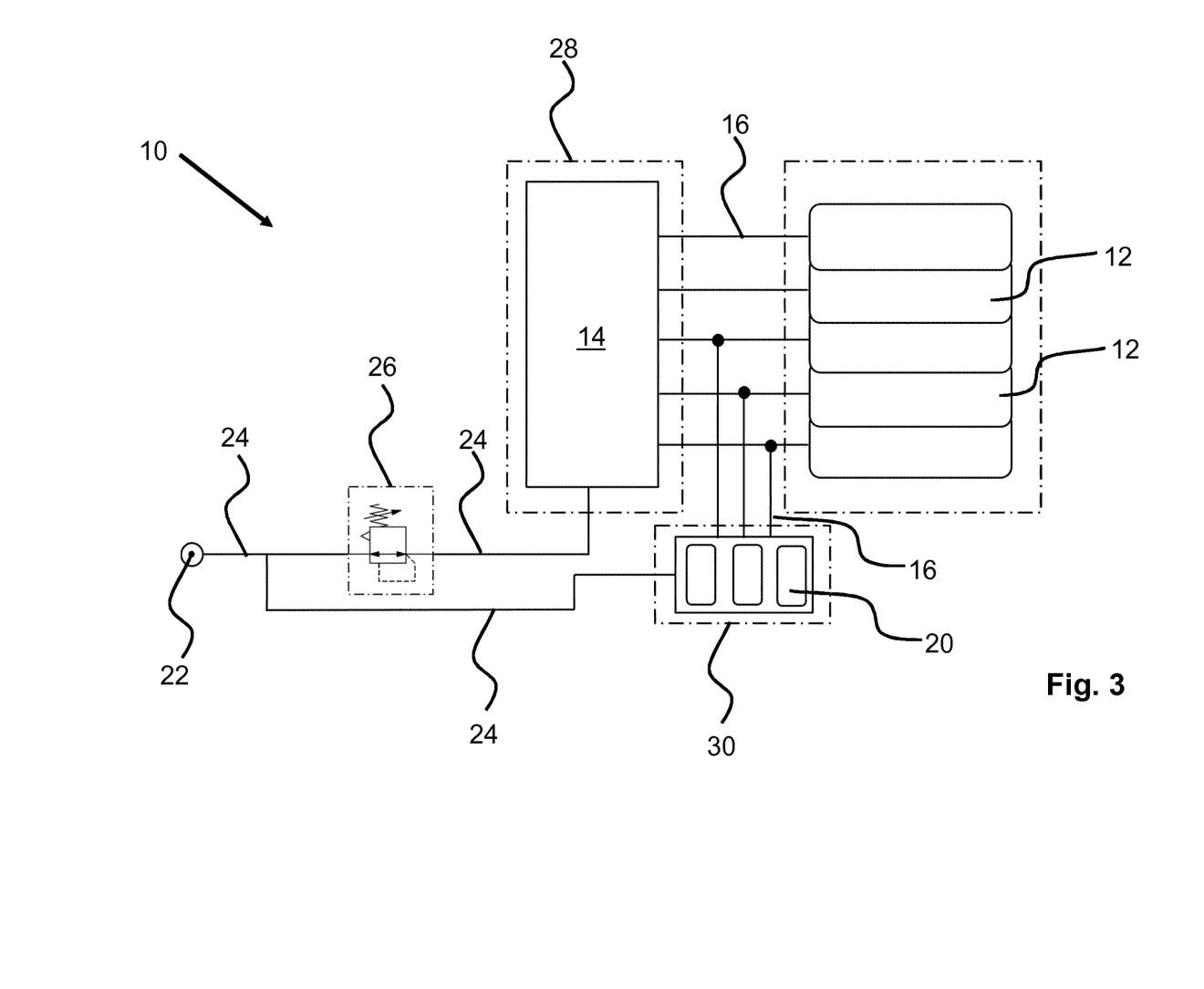
FIG. 3 is a diagrammatic view of a construction of the massage system in accordance with the first exemplary embodiment of FIG. 1.

FIG. 3 diagrammatically shows a construction of the massage system 10 in accordance with the first exemplary embodiment of FIG. 1. According to the invention, the massage system 10 can be connected to a connector 22 of an external compressed air supply, in particular a compressed air supply of a vehicle, for the supply with a pressure-conducting medium. A connector line 24 leads from the connector 22 to a control unit 28. As FIG. 3 shows, a regulating valve 26 can be arranged in the connector line 24, which regulating valve 26 reduces, in particular, the pressure level of the pressure-conducting medium which is removed from the connector 22 to a predefined pressure level. An air pressure system which is present, for example, in a commercial vehicle for actuating an air brake system and/or a seat height adjuster and/or a seat suspension system usually has a pressure level in the range from 6 to 12 bar which correspondingly likewise prevails at the connector 22. The pressure level can correspondingly be reduced by using the regulating valve 26 to a pressure level in the range from 200 to 600 hPa (hectopascals), preferably from 300 to 500 hPa (hectopascals). Furthermore, it can be provided that the regulating valve 26 is set up to limit the pressure-conducting medium to a predefined volumetric flow.

The control unit 28 comprises, in particular, a controller 14, in order to individually actuate the different elements 12 which can be pressurized. To this end, the elements 12 which can be pressurized are flow-connected to the controller 14 in each case by way of a dedicated connecting line 16. The connecting line 16 can preferably be a pneumatic hose. In order to fill and to deploy the elements 12 which can be pressurized, a connection between the connector line 24 and the respective connecting line 16 is established by the controller 14, with the result that the pressure-conducting medium can flow from the connector 22 as far as into the respective element 12 which can be pressurized. In order to prevent overfilling of the element 12 which can be pressurized, a pressure relief valve can be provided between the controller 14 and the elements 12 which can be pressurized. The pressure relief valve can be an integral constituent part of the controller 14.

Furthermore, the exemplary embodiment which is shown in FIG. 3 has a user interface 30. The user interface 30 is likewise connected to the connector line 24, with the result that the user interface 30 is supplied on the input side with the pressure-conducting medium. Furthermore, the user interface 30 is connected on the output side via connecting lines 16 to a part quantity or a total quantity of the elements 12 which can be pressurized; preferably that part quantity of elements 12 which are arranged in the region of the lumbar vertebrae of an occupant. By utilizing the user interface 30, the occupant can manually fill or empty the elements 12 which can be pressurized and are arranged in the lumbar vertebrae region with the pressure-conducting medium, in particular with compressed air. This possibility of manual setting serves for continuous setting of a seat contour with the function of a lumbar support when the massage system 10 is deactivated.

After an activation of the massage system 10, in particular a start of a massage program, the controller 14 first of all empties the elements 12 which can be pressurized, in particular those elements 12 which can be pressurized which provide the function of a lumbar support. The emptying of the elements 12 which can be pressurized takes place generally by way of opening of a corresponding valve, for example a correspondingly controllable valve and/or a pressure relief valve which can be opened in an active manner. Active emptying of the elements 12 which can be pressurized is not necessary. Rather, the elements 12 which can be pressurized are compressed by way of a pressure which is generated between the foam part and the cover or between the foam part and the frame structure of the backrest 3 of the vehicle seat 1, for example pressure which is generated by an occupant or the foam part, and are emptied as far as possible as a consequence.

After a preprogrammed massage program has ended and/or a predefined time has elapsed, the massage system can automatically be ended. After ending of the massage program, the controller 14 can again return those elements 12 which can be pressurized and can be used as lumbar supports to the state which was set at the outset, and can correspondingly load them with the pressure-conducting medium.

The user interface 30 can provide the occupant with corresponding buttons for operation, in particular buttons of a switch 20. Furthermore, the user interface 30 can likewise have a pressure relief valve. Contrary to the shown attachment of the user interface 30 to the connector 22, the connector line 24 can likewise be attached in flow terms downstream of the regulating valve 26, as a result of which the user interface 30 is likewise loaded with the pressure-conducting medium which has the reduced pressure level. It is likewise conceivable, furthermore, that the user interface 30 is provided with a dedicated regulating valve for providing a pressure level which is different than the pressure level which prevails at the output of the regulating valve 26.

Figure 4:
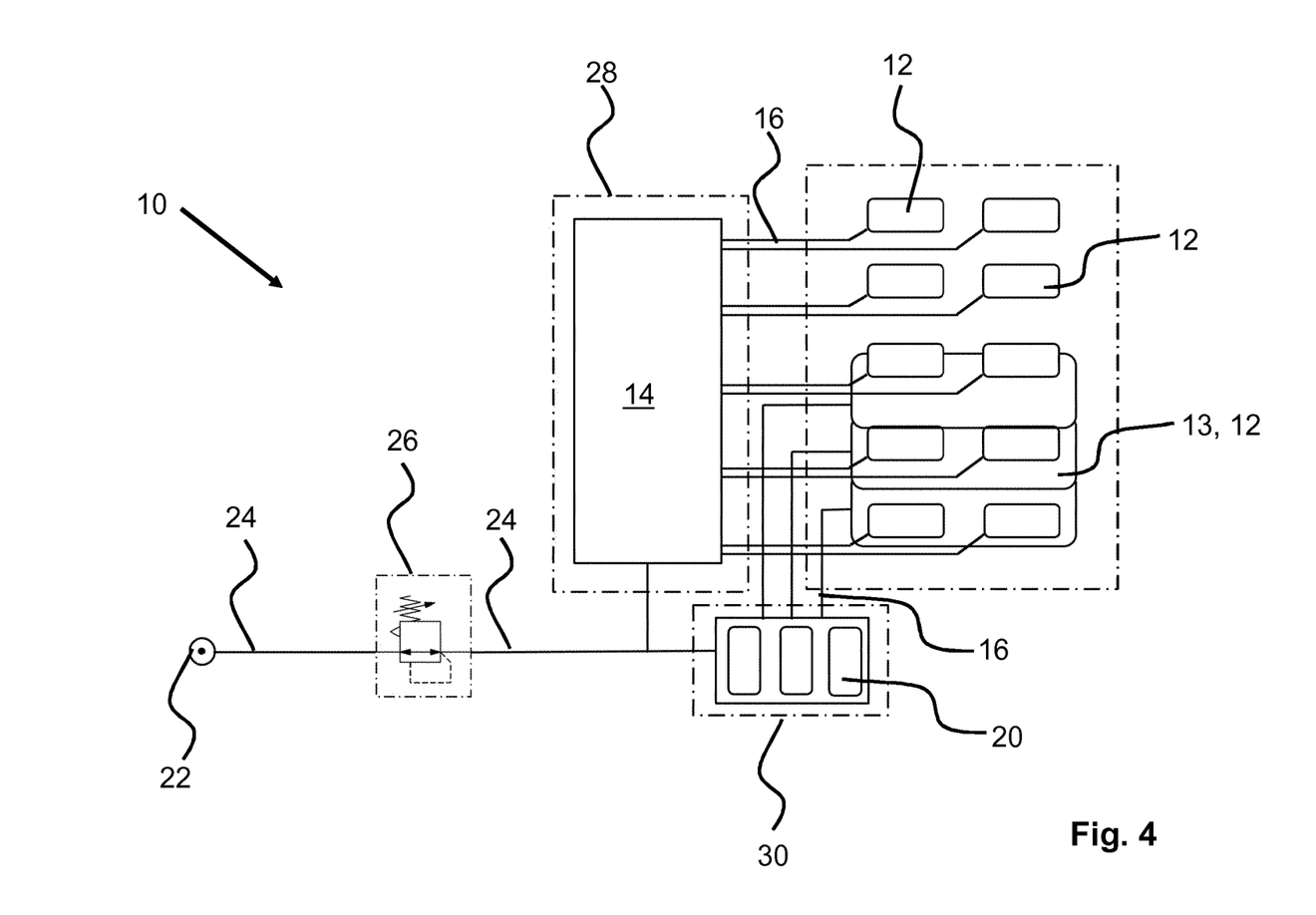
FIG. 4 is a diagrammatic view of a construction of the massage system in accordance with the second exemplary embodiment of FIG. 2.

FIG. 4 diagrammatically shows a construction of the massage system in accordance with the second exemplary embodiment of FIG. 2. Said exemplary embodiment shows an abovementioned attachment of the connector line 24 for the user interface 30 in a part section which is situated downstream of the regulating valve 26 in flow terms. Furthermore, the massage system 10 which is shown in FIG. 4 corresponds substantially to the exemplary embodiment according to FIG. 3, with the exception of the elements 12 which can be pressurized. The elements 12 which can be pressurized of the second exemplary embodiment of FIG. 2 are divided into a left-hand and right-hand side as viewed in the viewing direction of an occupant who is seated in the vehicle seat 1 of FIG. 2. As a result, the number of connecting lines 16 for actuation by way of the controller 14 doubles by comparison. This variant of the smaller elements 12 which can be pressurized and are divided into a left-hand and right-hand side is preferably arranged on the A-side 13 of a foam part. A more direct and more punctiform pressure sensation can be achieved as a result.

A lumbar support element 13 which has, in particular, three elements 12 which can be pressurized is provided in order to produce a support function for the region of the lumbar vertebrae of an occupant. The lumbar support element 13 is preferably arranged on the B-side 11 of the foam part of a backrest 3 of a vehicle seat 1. The lumbar support element 13 can be set by using a user interface 30.

Figure 5:
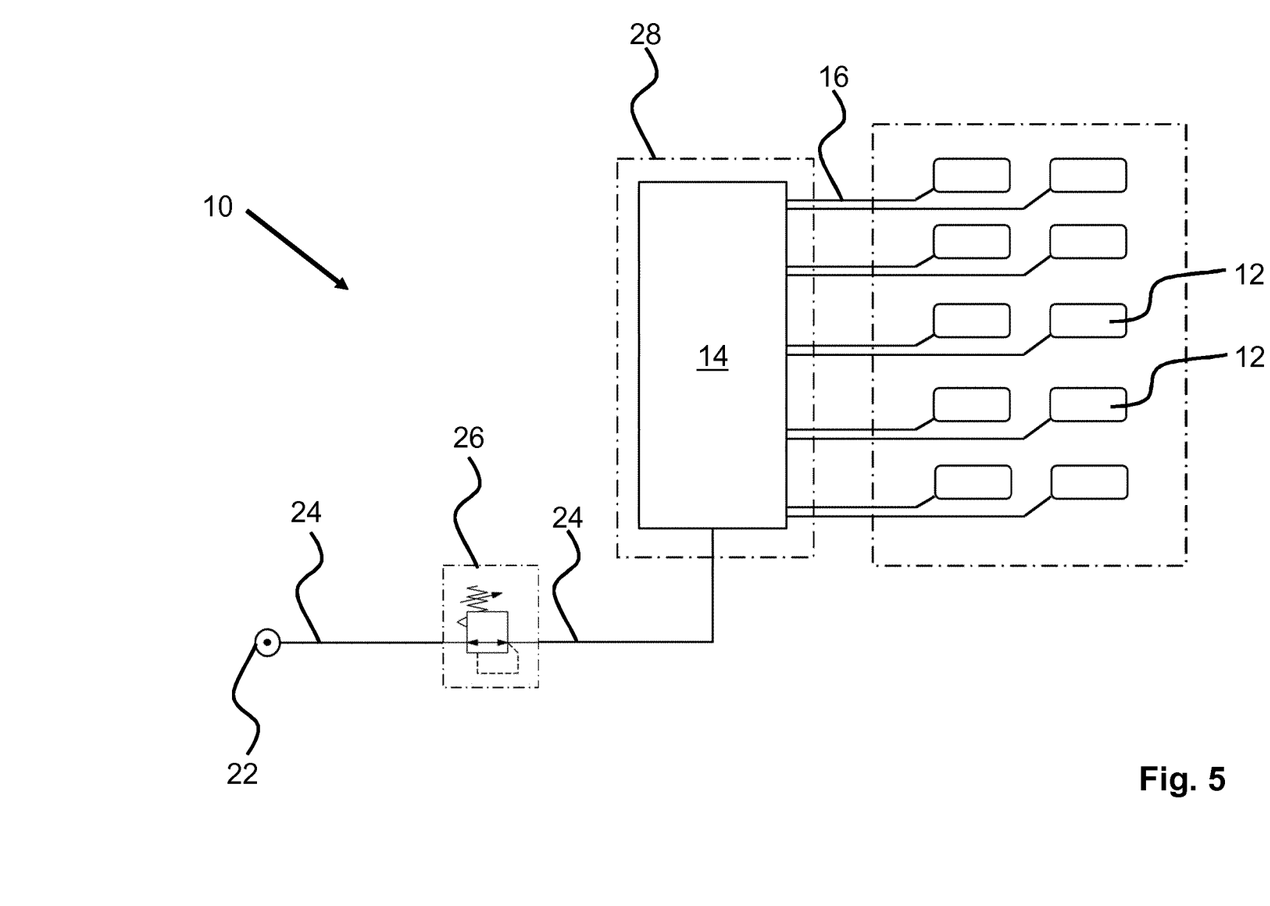
FIG. 5 is a diagrammatic view of a construction of a third exemplary embodiment of the massage system.

FIG. 5 diagrammatically shows a construction of a further exemplary embodiment of the massage system 10. The exemplary embodiment which is shown corresponds substantially to the exemplary embodiment according to FIG. 4, with the exception that a function of the lumbar support is not provided.

Figure 6:
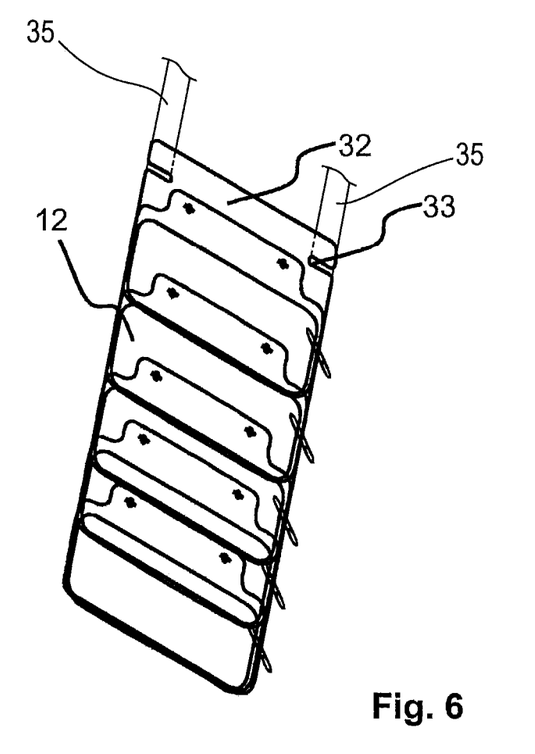
FIG. 6 is a diagrammatic view of a holding element having a plurality of elements which can be pressurized, in accordance with the first exemplary embodiment of FIG. 1.

FIG. 6 diagrammatically shows a holding element 32 having a plurality of elements 12 which can be pressurized, which holding element 32 is used in the first exemplary embodiment according to FIG. 1. The holding element 32 positions the plurality of elements 12 which can be pressurized relative to one another and holds them in position. Furthermore, the holding element 32 has a connecting portion 33, by which the holding element 32 can be fastened, in particular can be hooked, to a frame structure 35 of a backrest 3 of a vehicle seat 1.

Figure 7:
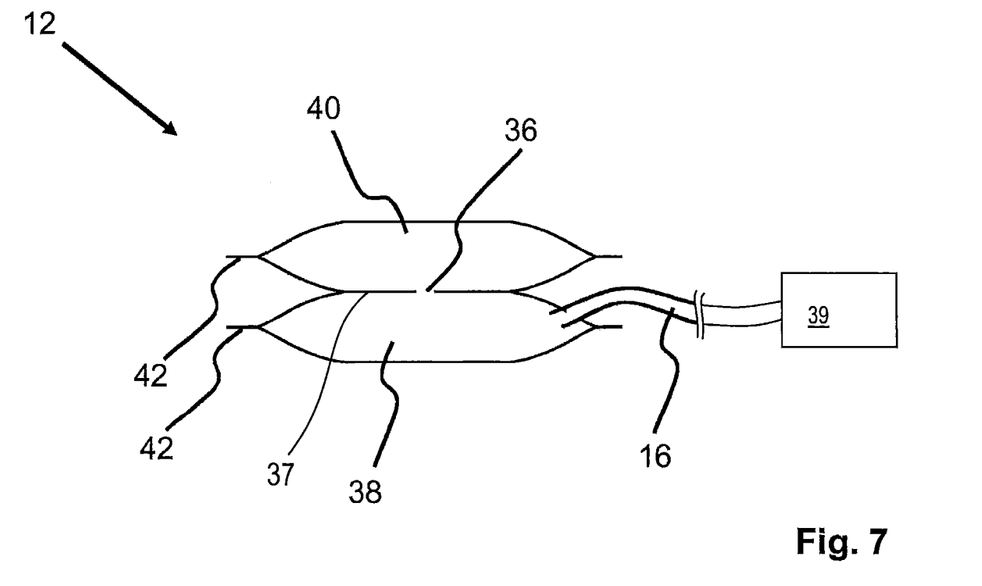
FIG. 7 is a cross-sectional illustration of an exemplary element which can be pressurized.

FIG. 7 shows a cross-sectional illustration of an exemplary element 12 which can be pressurized and has a first chamber 38 and a second chamber 40. The first chamber 38 and the second chamber 40 are connected to one another in flow terms via a through opening 36. The opening 36 may be disposed in a wall portion 37 separating the first chamber 38 from the second chamber 40 of the elements 12. The elements 12 which can be pressurized are preferably manufactured from a plastic, in particular a plastic film. Furthermore, the elements 12 which can be pressurized can be manufactured in an outer edge region of the elements 12 which can be pressurized, with the formation of a connecting seam 42, in particular a gastight welded seam. Furthermore, the first chamber 38 is connected in flow terms to the connecting line 16 which in turn is in fluid communication with the compressed air supply 39.

Figure 8:
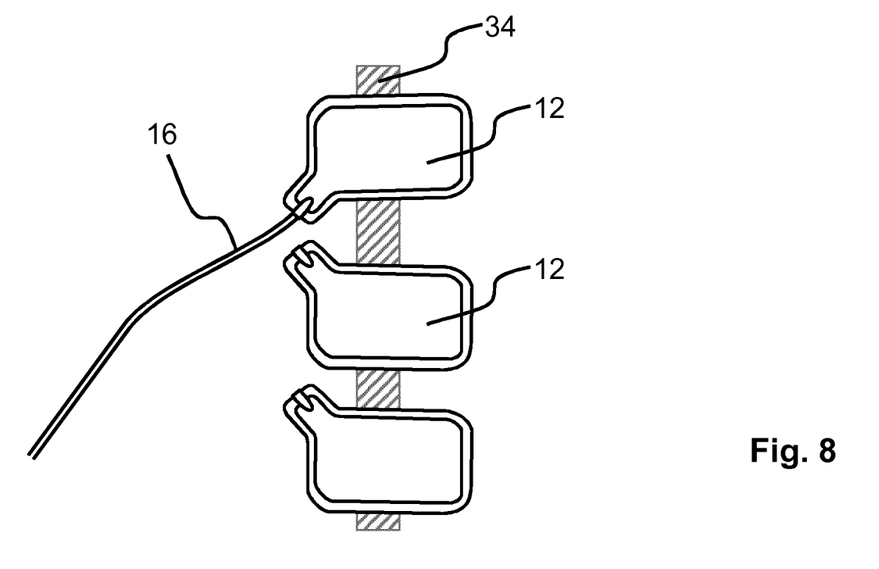
FIG. 8 is a diagrammatic illustration of a holding element having a plurality of elements which can be pressurized, in accordance with the second exemplary embodiment of FIG. 2.

FIG. 8 diagrammatically shows a holding element 32 having a plurality of elements 12 which can be pressurized, in accordance with the second exemplary embodiment of FIG. 2. The elements 12 which can be pressurized preferably have the construction according to FIG. 7. The elements 12 which can be pressurized are arranged on a connecting strip 34 for positioning relative to one another. The elements 12 which can be pressurized are connected fixedly to the connecting strip, and are preferably connected by use of an adhesive bond. For the arrangement on the A-side 11 of a foam part of the seat cushion 2 and/or the backrest 3 of the vehicle seat 1, the foam part preferably has correspondingly provided recesses 43 which receive in each case one element 12 which can be pressurized and secure it against slipping.

Figure 9:
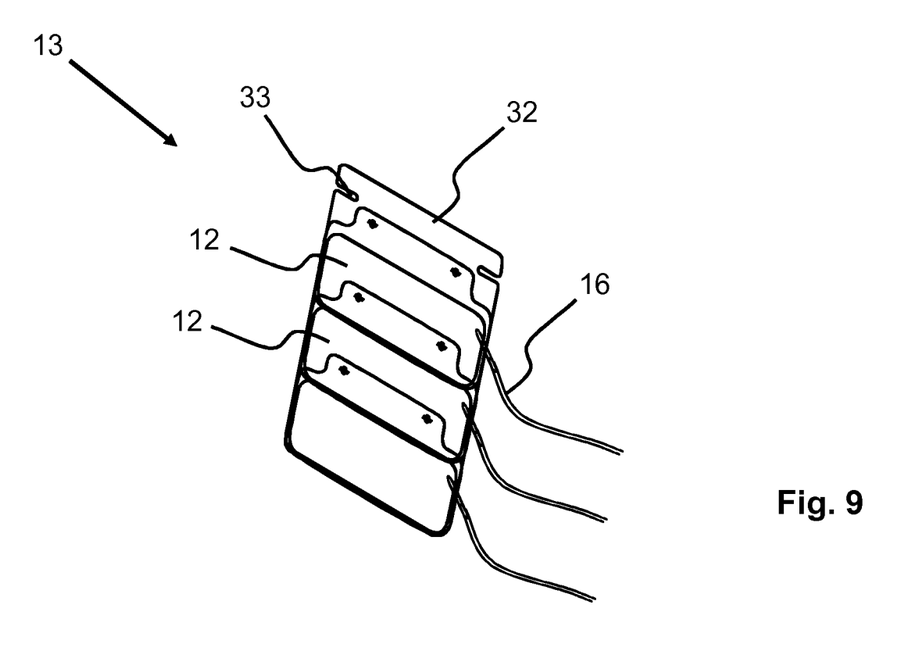
FIG. 9 is a diagrammatic illustration of a lumbar support element having a plurality of elements which can be pressurized, in accordance with the second exemplary embodiment of FIG. 2.
Figure 10:
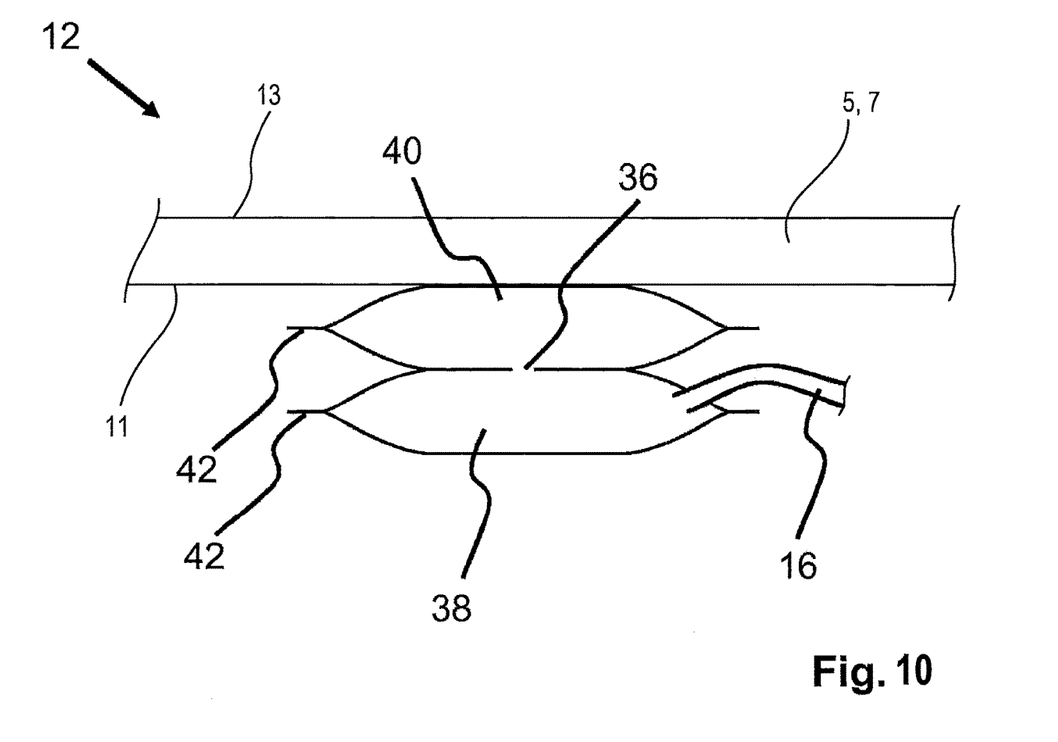
FIG. 10 is a schematic illustration of a portion of the vehicle seat and message system according to an embodiment of the disclosure.
Figure 11:
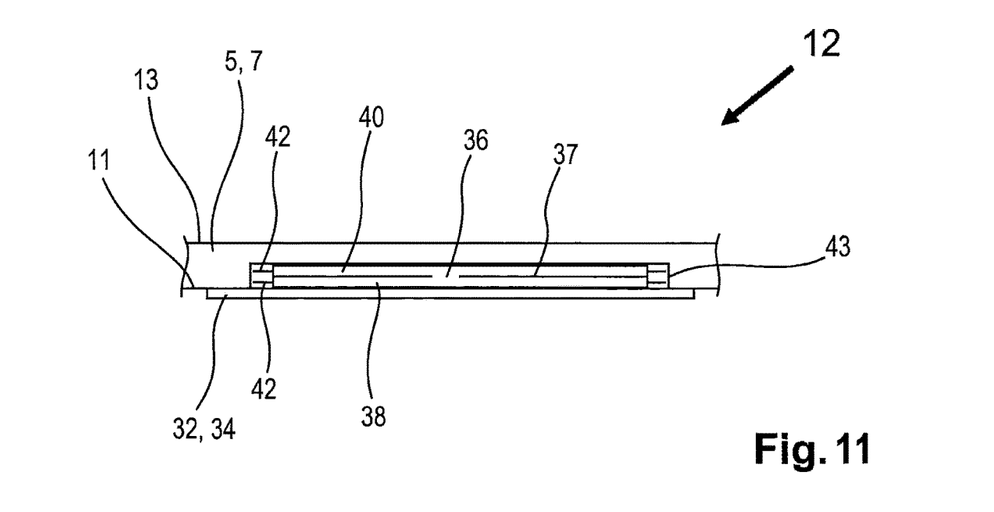
FIG. 11 is a schematic illustration of a portion of the vehicle seat and message system according to an embodiment of the disclosure.

FIG. 9 diagrammatically shows a lumbar support element 13 which has a plurality of elements 12 which can be pressurized, in accordance with the second exemplary embodiment of FIG. 2. The lumbar support element 13 corresponds substantially to the construction of the holding element 32 which is shown in FIG. 6.

The features which are disclosed in the above description, the claims and the drawings can be of significance both individually and in combination for the implementation of the invention in its various embodiments.

Although the invention has been described in detail in the drawings and the preceding description, the descriptions are illustrative and exemplary and are not to be understood to be restrictive. In particular, the selection of the proportions shown in the drawings of the individual elements is not to be interpreted as required or restrictive. Furthermore, the invention is not restricted, in particular, to the exemplary embodiments which are described. Further variants of the invention and its execution arise for a person skilled in the art from the preceding disclosure, the figures and the claims.

Terms such as "comprise", "have", "contain", "include" and the like which are used in the claims do not rule out further elements or steps. The use of the indefinite article does not rule out a plurality. A single device can carry out the functions of a plurality of units or devices mentioned in the claims.

While specific embodiments of the invention have been shown and described in detail to illustrate the application of the principles of the invention, it will be understood that the invention may be embodied otherwise without departing from such principles.

The invention claimed is:

1. A vehicle seat comprising:
a seat cushion with padding;
a backrest with padding;
a massage system having a plurality of elements which can be pressurized;
wherein the plurality of elements which can be pressurized comprises a first plurality of elements which can be pressurized and a second plurality of elements which can be pressurized;
a controller for a targeted actuation of the first and second plurality of elements which can be pressurized in order to achieve a massage effect;
one or more first connecting lines pressurizing the first and second plurality of elements which can be pressurized separately;
a connector connecting the massage system to an external compressed air supply to provide a pressurizing medium;
a foam part having a first side and a second side;
wherein the first side of the foam part faces an occupant when in use;
wherein the second side of the foam part faces away from the occupant when in use;
a cover disposed over at least a portion of the foam part;
a regulating valve arranged between the connector and the controller;
wherein the regulating valve is configured to limit the pressurizing medium to a predefined value of a volumetric flow;
wherein the first plurality of elements which can be pressurized are arranged on the first side of the foam part of the padding of the seat cushion and/or the backrest;
wherein the second plurality of elements which can be pressurized are arranged on the second side of the foam part of the padding of the seat cushion and/or the backrest; and
wherein at least a portion of the first plurality of elements which can be pressurized are in direct contact with at least a portion of the cover and at least a portion of the first side of the foam part.

2. The vehicle seat of claim 1, wherein the external compressed air supply is a compressed air supply of a vehicle.

3. The vehicle seat of claim 1, wherein the second plurality of elements which can be pressurized are arranged on the second side of the foam part in a region between the foam part and a frame structure of the backrest.

4. The vehicle seat of claim 1, wherein the foam part has a plurality of recesses, wherein the plurality of recesses in the foam part have a size and shape to receive the first or second plurality of elements which can be pressurized therein.

5. The vehicle of claim 1, wherein the regulating valve is set up to reduce a pressure of the pressurizing medium to a predefined pressure level.

6. The vehicle seat of claim 5, wherein the pressure being reduced to a pressure level in a range from 200 to 600 hPa.

7. The vehicle seat of claim 1, wherein the volumetric flow is limited to a value in the range from 5 to 10 liters per minute.

8. The vehicle seat of claim 1, further comprising a user interface, wherein the user interface is selectively engagable by an occupant to selectively fill or empty one or more of the first or second plurality of elements which can be pressurized in a controlled manner with the pressurizing medium.

9. The vehicle seat of claim 8, wherein the regulating valve is in communication with the controller by using a second connecting line;
wherein the regulating valve is in communication with the connector by using a third connecting line;
wherein the user interface is in communication with the one or more first connecting lines by using one or more fourth connecting lines;
wherein the user interface is in communication with the external compressed air supply by using a fifth connecting line; and
wherein the fifth connecting line is connected to the third connecting line at a location between the regulating valve and the connector.

10. The vehicle seat of claim 1, wherein the first and second plurality of elements which can be pressurized are connected to a holding element, wherein at least a portion of the holding element is connected to at least a portion of a frame structure of the backrest.

11. The vehicle seat of claim 1, wherein the first and second plurality of elements which can be pressurized are connected to a holding element, wherein the holding element is hooked to a frame structure of the backrest.

12. The vehicle seat of claim 1, wherein the first and/or second plurality of elements which can be pressurized are connected to and arranged along a connecting strip by an adhesive bond therebetween.

13. The vehicle seat of claim 1, wherein the first and/or second plurality of elements which can be pressurized comprises a first chamber and a second chamber with a wall portion therebetween.

14. The vehicle seat of claim 13, wherein the wall portion has one or more openings therein fluidly connecting the first chamber and the second chamber.

15. The vehicle seat of claim 13, wherein at least a portion of the one or more first connecting lines are in fluid communication with at least a portion of the first chamber of the first and/or second plurality of elements which can be pressurized.

16. The vehicle seat of claim 13, wherein at least a portion of the second chamber of the first and/or second plurality of elements which can be pressurized are disposed adjacent to and outward from at least a portion of the first chamber of the first and/or second plurality of elements which can be pressurized.

17. The vehicle seat of claim 1, wherein the first and/or second plurality of elements which can be pressurized are made of a plastic material.

18. The vehicle seat of claim 1, wherein the first and/or second plurality of elements which can be pressurized form a portion of a lumbar support element.

19. The vehicle seat of claim 1, wherein at least a portion of the first and/or second plurality of elements which can be pressurized are hooked into a holding element.

20. The vehicle seat of claim 1, wherein the second plurality of elements which can be pressurized on the second side of the foam part allow a massaging pressure provided by the second plurality of elements which can be pressurized to be applied over an area larger than an amount of massaging pressure provided by the first plurality of elements which can be pressurized on the first side of the foam part.

* * * * *